US011159366B1

(12) United States Patent
Gawade et al.

(10) Patent No.: US 11,159,366 B1
(45) Date of Patent: Oct. 26, 2021

(54) SERVICE CHAINING FOR VIRTUAL EXECUTION ELEMENTS

(71) Applicant: Juniper Networks, Inc., Sunnyvale, CA (US)

(72) Inventors: Aniket J. Gawade, Fremont, CA (US); Yuvaraja Mariappan, San Jose, CA (US); Sachchidanand Vaidya, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 112 days.

(21) Appl. No.: 16/145,586

(22) Filed: Sep. 28, 2018

(51) Int. Cl.
*H04L 12/24* (2006.01)
*H04L 29/08* (2006.01)

(52) U.S. Cl.
CPC ...... *H04L 41/0803* (2013.01); *H04L 67/1002* (2013.01)

(58) Field of Classification Search
CPC ........................ H04L 41/0803; H04L 67/1002
See application file for complete search history.

(56) References Cited

U.S. PATENT DOCUMENTS 9,276,816 B1 * 3/2016 Conte ..................... H04L 41/12
9,479,457 B2 10/2016 Sindhu
9,571,394 B1 2/2017 Sivaramakrishnan et al.
10,013,189 B1 * 7/2018 Yang ..................... G06F 3/0619
10,025,924 B1 * 7/2018 Vagin ...................... G06F 21/53
10,146,936 B1 * 12/2018 Khanduja ............. G06F 21/552
10,191,778 B1 * 1/2019 Yang .................. G06Q 30/0283
10,362,092 B1 7/2019 Parthasarathy
10,423,493 B1 * 9/2019 Vig ..................... G06F 16/2322
10,616,072 B1 * 4/2020 Lo ......................... H04L 41/064
10,791,144 B1 * 9/2020 Golan ................. H04L 67/1002
10,805,181 B2 * 10/2020 Boutros ............. H04L 12/4633
(Continued)

FOREIGN PATENT DOCUMENTS

WO 2013184846 A1 12/2013

OTHER PUBLICATIONS

"Juniper/Contrail-Specs/kubernetes-5.0.md" GitHub, Apr. 26, 2018, available at https://github.com/Juniper/contrail-specs/blob/master/kubernetes-5.0.md (last accessed Sep. 26, 2018), 3 pp.
"Services, Load Balancing, and Networking—Kubernetes", The Kubemetes Authors, available at https://kubernetes.io/dots/concepts/services-networking/ (last accessed Sep. 26, 2018), May 5, 2018, 19 pp.

(Continued)

*Primary Examiner* — Javier O Guzman
(74) *Attorney, Agent, or Firm* — Shumaker & Sieffert, P.A.

(57) ABSTRACT

Techniques are described for providing a controller to configure, within a given namespace, a virtual network for a pod and an application service address for an application service to enable access to the pod. For example, the controller may configure in each namespace a virtual network for a logically-related group of one or more containers ("pod") and application service address for an application service that is an abstraction which defines a logical set of pods and a policy by which to access the pods (e.g., load balancing). Techniques are also described for providing a controller to configure controller configures the service chain by configuring the left interface of a service node with a virtual routing and forwarding instance (VRF) identifying the pod of a first namespace and the right interface of the service node with a VRF identifying the application service of a second namespace.

20 Claims, 6 Drawing Sheets

502: CREATE A PLURALITY OF NAMESPACES INCLUDING A FIRST NAMESPACE ASSOCIATED WITH A FIRST TENANT AND A SECOND NAMESPACE ASSOCIATED WITH A SECOND TENANT

504: ISOLATE A FIRST APPLICATION SERVICE OF A FIRST TENANT FROM A SECOND APPLICATION SERVICE OF A SECOND TENANT

506: GENERATE A MULTI-TENANT SERVICE CHAIN THAT CAUSES TRAFFIC RECEIVED BY A SERVICE NODE AND FROM A FIRST LOGICALLY-RELATED GROUP OF ONE OR MORE CONTAINERS OF THE FIRST NAMESPACE TO BE PROCESSED BY THE SERVICE NODE AND STEERED TO THE SECOND APPLICATION SERVICE OF THE SECOND NAMESPACE

(56) References Cited

U.S. PATENT DOCUMENTS

| | | | | |
|---|---|---|---|---|
| 2008/0151893 | A1* | 6/2008 | Nordmark | H04L 45/60<br>370/392 |
| 2012/0042054 | A1* | 2/2012 | Kotha | G06F 9/45558<br>709/220 |
| 2015/0370586 | A1* | 12/2015 | Cooper | G06F 12/0223<br>710/308 |
| 2015/0372935 | A1 | 12/2015 | Åkervik et al. | |
| 2016/0105393 | A1* | 4/2016 | Thakkar | H04L 67/10<br>709/220 |
| 2016/0182279 | A1* | 6/2016 | Gong | H04L 41/12<br>370/254 |
| 2017/0041288 | A1* | 2/2017 | Stotski | H04L 69/162 |
| 2017/0244593 | A1* | 8/2017 | Rangasamy | H04L 12/4683 |
| 2018/0084084 | A1 | 3/2018 | Sharma | |
| 2018/0159729 | A1 | 6/2018 | Deshmukh et al. | |
| 2019/0065323 | A1 | 2/2019 | Dhamdhere et al. | |

OTHER PUBLICATIONS

"PCI-SIG SR-IOV Primer: An Introduction to SR-IOV Technology," Rev. 2.5, Intel Corp., Jan. 2011, 28 pp.

Mackie et. al, "BGP-Signaled End-System IP/VPNs," draft-ietf-I3vpn-end-system-06, Dec. 15, 2016, 31 pp.

Rosen et al. "BGP/MPLS IP Virtual Private Networks (VPNs)," Request for Comments 4364, Internet Engineering Task Force Network Working Group, Feb. 2006, 47 pp.

Singla et al. "OpenContrail Architecture Document" Architecture Documentation, Nov. 20, 2013, 42 pp.

U.S. Appl. No. 16/118,107, filed Aug. 30, 2018, Juniper Networks, Inc. (inventor: Rao et al.) entitled "Multiple Virtual Network Interface Support for Virtual Execution Elements."

U.S. Appl. No. 16/145,609, by Juniper Networks, Inc., (Inventors: Gawade et al.), filed Sep. 28, 2018.

Marmol et al., "Networking in containers and container clusters." In Proceedings of netdev 0.1, Feb. 14-17, 2015, 4 pp.

* cited by examiner

SERVICE CHAINING FOR VIRTUAL EXECUTION ELEMENTS

TECHNICAL FIELD

The disclosure relates to a virtualized computing infrastructure and, more specifically, to configuring network connectivity for virtual execution elements (e.g., virtual machines or containers) deployed to virtualized computing infrastructure within a network.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements such virtual machines or containers (or groups of virtual machines or containers), are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for providing a controller to configure, within each namespace, a virtual network for a pod and an application service address for an application service to enable access to the pod, and may further configure a service chain between the pod of one namespace and an application service of a different namespace to preserve tenant isolation of a multi-tenant data center. For example, the controller may configure in each namespace a virtual network for a logically-related group of one or more containers ("pod") and application service address for an application service that is an abstraction which defines a logical set of pods and a policy by which to access the pods (e.g., load balancing). Accordingly, techniques in accordance with one or more aspects of the present disclosure may enable creation of service networks on a per-namespace basis and a service chain among the isolated networks to preserve tenant isolation.

As described herein, in some examples, the controller may create within each namespace a virtual network interface usable by the pod (referred to herein as "pod virtual network interface") that enables packetized communications by containers of the pod on the pod virtual network. Within the same namespace, the controller may also configure an application service that enables external communication to be load balanced to one or more pods via the application service. In this way, application services are configured with their own network for a given namespace rather than in a common network that shares the application services among all namespaces.

The controller may also create a service chain including a pod of a first namespace, an application service of a second namespace, and a service node that directs a packet flow from the pod of the first namespace to the application service of the second namespace. In one example implementation, the controller may automatically configure virtual private networks to establish a virtual network topology to direct traffic flows to a service node ("service chain") that provides a network service to the traffic flows. For example, a controller that controls, in a centralized manner, routing within one or more networks may configure routes obtained from a destination network to direct traffic destined for prefixes associated with the obtained routes to a service node, and then to the destination network. A service node may import the routes, which cause the service node to steer traffic from one routing instance to another routing instance. The routing instance may correspond to a virtual routing and forwarding instance (VRF). For example, an interface of the service node may be configured with a VRF associated with a pod virtual network of a first namespace and another interface of the service node may be configured with a VRF associated with an application service of a second namespace.

The techniques may provide one or more technical advantages. For example, the techniques described herein enable configuration of respective virtual networks for a pod and application service for a given namespace such that when implementing network services, each network service would be used by a single tenant, thereby preserving tenant isolation. In addition, the techniques described herein enable and/or provide for improved traffic steering among different virtual network functions (VNFs).

In one example, a method comprises creating, by a controller of a multi-tenant virtualized data center, a plurality of namespaces, each of the plurality of namespaces being associated with a different one of a plurality of tenants in the multi-tenant virtualized data center, wherein the plurality of namespaces includes a first namespace associated with a first tenant and a second namespace associated with a second tenant; isolating, by the controller, a first application service of the first tenant from a second application service of the second tenant by: configuring, by the controller, a first plurality of networks each associated with the first namespace, wherein the first plurality of networks includes one or more first virtual execution elements, and wherein the first plurality of networks includes the first application service; and configuring, by the controller, a second plurality of networks each associated with the second namespace, wherein the second plurality of networks includes one or more second virtual execution elements, and wherein the second plurality of networks includes the second application service.

In another example, a controller includes one or more processors coupled to a memory device, wherein the one or more processors are configured to: create a plurality of namespaces, each of the plurality of namespaces being associated with a different one of a plurality of tenants in a multi-tenant virtualized data center, wherein the plurality of namespaces includes a first namespace associated with a first tenant and a second namespace associated with a second tenant; isolate a first application service of the first tenant from a second application service of the second tenant by: configuring a first plurality of networks each associated with the first namespace, wherein the first plurality of networks includes one or more first virtual execution elements, and wherein the first plurality of networks includes the first application service; and configuring a second plurality of networks each associated with the second namespace, wherein the second plurality of networks includes one or more second virtual execution elements, and wherein the second plurality of networks includes the second application service.

In another example, a computing device comprises one or more processors coupled to a memory device, wherein the one or more processors are configured to: instantiate, based on configuration data from a controller, a virtual execution element as a logically-related group of one or more containers, wherein the virtual execution element is included within a namespace; attach a virtual network interface to the virtual execution element to enable packetized communications by the virtual execution element on a virtual network; configure, based on configuration data from the controller, an application service address for an application service to enable load balancing for the virtual execution element via the application service address, wherein the application service is included within the namespace.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
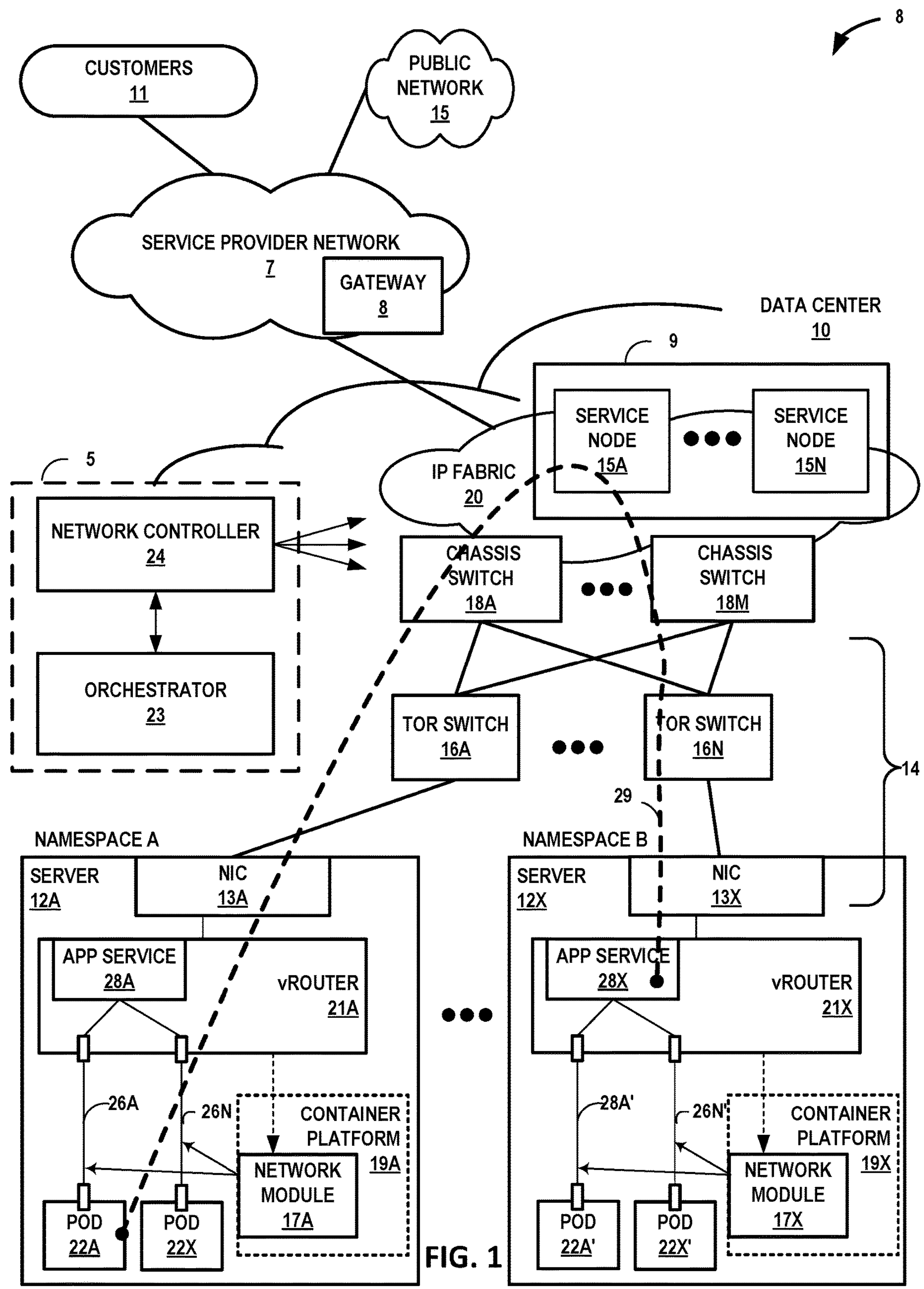
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N (collectively, "TOR switches 16"). Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes TOR switches 16 coupled to a distribution layer of chassis (or "spine" or "core") switches 18A-18M (collectively, "chassis switches 18"). In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 via service provider network 7. Although not shown, data center 10 may also include, for example, one or more non-edge switches, routers, hubs, gateways, computer terminals, laptops, printers, databases, wireless mobile devices such as cellular phones or personal digital assistants, wireless access points, bridges, cable modems, application accelerators, or other network devices. The switching architecture of data center 10 is merely an example. Other switching architectures may have more or fewer switching layers, for instance.

Data center 10 may include a service complex 9 having a cluster of service nodes 15A-15N (collectively, "service nodes 15") that provide an execution environment for the network services. That is, each of service nodes 15 apply one or more network services. As examples, service nodes 15 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 15 in this way represents a service instance.

Service complex 9 may include layer two (L2) and layer three (L3) switching and routing components that provide point-to-point connectivity between servers that execute one or more of service nodes 15 within a virtual environment. That is, one or more of service nodes 15 may run as virtual machines in a virtual compute environment. For example, servers 12 may provide Network Function Virtualization infrastructure (NFVI) for an NFV architecture. In another example, service nodes 15 may be physical network functions (PNFs) such as physical firewalls, load balancers, and other PNFs. In these examples, service nodes 15 may comprise a combination of general purpose computing devices and special purpose appliances.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, VXLAN tunnels, or NVGRE tunnels, for instance. The underlay physical routers and switches might not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12 (gateway routers or switches that connect a virtual network to a physical network are an exception and may contain tenant MAC or IP addresses).

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-13vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. That is, the containers are decoupled from the underlying infrastructure and from the host. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. That is, a container may run on a given namespace and access to the container is limited to that namespace.

In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and control groups (cgroups) in the Linux kernel on the LXC host. Additional information regarding containers is found in "Docker Overview," Docker, Inc., available at docs.docker.com/engine/understanding-docker, last accessed Sep. 11, 2018. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), an application service for the set of one or more containers (as further described below), or other virtual execution element (s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers and an application service for the pod. As shown in FIG. 1, server 12A hosts a virtual network endpoint in the form of pods 22A-22X, pods 22A'-22X' (collectively, "pods 22") each having one or more containers. However, a server 12 may execute as many virtual execution elements as is practical given hardware resource limitations of the server 12. That is, although illustrated with a single pod, server 12 may execute one or more additional pods depending on the hardware resource limitations of server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January, 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12 or one of service nodes 15. As used herein, virtual routers 21 may each execute the operations of a tunnel endpoint to encapsulate inner packets sourced by virtual network endpoints to generate tunnel packets and de-encapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and application services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices or execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases network controller 24, may implement respective cluster masters for one or more clusters, e.g., Kubernetes clusters. As an example, Kubernetes is a container management platform that provides portability across public and private clouds, each of which may provide virtualization infrastructure to the container management platform. For ease of illustration, the following is described with respect to server 12A, and the description is equally applicable to server 12X.

In one example implementation, each of pods 22 is a Kubernetes pod and an example of a virtual network endpoint. A pod is a group of one or more logically-related containers (not shown in FIG. 1), which share the same network namespace, and options on how to run the containers. Where instantiated for execution, a pod may alternatively be referred to as a "pod replica." Each container of pods 22 is an example of a virtual execution element. Containers of a pod are co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are able to communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

In the example server 12A of FIG. 1, pod 22A is a virtual network endpoint in multiple different virtual networks. Orchestrator 23 may store or otherwise manage configuration data for application deployments that specifies the multiple virtual networks and specifies that pod 22A (or the one or more containers therein) is a virtual network endpoint of each of the multiple virtual networks. Orchestrator 23 may receive the configuration data from a user, operator/administrator, or other machine system, for instance.

To enable communication between the pods of multiple different virtual networks, pods may implement an application service. In one example implementation, the application service is a Kubernetes service. The application service is an abstraction that defines a logical set of pods and the policy used to access the pods. In some examples, the application service may comprise an Equal-Cost Multi-Path (ECMP) load balancer that load balances traffic to the pods. For example, an application service may be configured with a virtual network address (referred to herein as "application service address) that is used to provide the application service for one or more pods. When implementing the application service, the service address is advertised to external entities such that traffic from the external entities may be load balanced to the one or more pods that are associated with the application service address.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints, e.g., pod 22A. The container platform 19A uses network module 17A to manage networking for pods, including pod 22A. Network module 17A may assign a network address (e.g., a virtual IP address for the virtual network) and may setup routes for a virtual network interface. For example, the network module 17A creates virtual network interface 26A to connect pod 22A to virtual router 21A and enable containers of pod 22A to communicate, via the virtual network interfaces 26, to other virtual network endpoints over the virtual networks. Virtual network interface 26A may represent a virtual ethernet ("veth") pair, where each end of the pair is a separate device (e.g., a Linux/Unix device), with one end of the pair assigned to pod 22A and one end of the pair assigned to virtual router 21A. The veth pair or an end of a veth pair are sometimes referred to as "ports". Virtual network interfaces 26 may alternatively represent a different type of interface between a virtual router or other network virtualization entity and virtual network endpoints. Virtual network interfaces 26 may alternatively be referred to as virtual machine interfaces (VMIs), pod interfaces, container network interfaces, tap interfaces, veth interfaces, or simply network interfaces (in specific contexts), for instance.

Network module 17A may, for example, insert virtual network interface 26A for a virtual network into the network namespace for containers of pod 22A and configure (or request to configure) the virtual network interface 26A for the virtual network in virtual router 21A such that the virtual router 21A is configured to send packets received from the virtual network via the virtual network interface 26A to containers of pod 22A and to send packets received via the virtual network interface 26A from containers of pod 22A on the virtual network. The network namespace may include one or more virtual clusters that are grouped in a shared or single project.

Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

The CNI specification specifies a number of considerations for a conforming plugin ("CNI plugin"). These include the following:

- The container runtime must create a new network namespace for a container before invoking any CNI plugin.
- The container runtime must then determine which networks this container should belong to, and for each network, which plugins must be executed.
- The container runtime must add the container to each network by executing the corresponding plugins for each network sequentially.

In Kubernetes, by default all pods can communicate with all other pods without using network address translation (NAT). In some cases, a pod virtual network is configured for each namespace for containers of a pod, e.g., pod 22A, and is shared by all namespaces, from which pod network addresses are allocated. In these cases, all pods in all namespaces that are spawned in the Kubernetes cluster may be able to communicate with one another, and the network addresses for all of the pods may be allocated from a pod subnet that is specified by orchestrator 23.

Typically, in Kubernetes, the application service is shared by all the namespaces, from which an application service address is allocated. In Kubernetes, the application service virtual network is configured within the same network as the pod virtual network. By implementing a shared application service virtual network, route leaking may occur among tenants of a data center. For example, when applying network services (e.g., firewall from a service node) to traffic destined for containers of pods 22, all traffic traverses through the shared virtual network for the application services before being directed to the respective service node that applies a corresponding network service. However, traffic that may implement a different network service provided by a different service node is unable to be segregated from the traffic. As further described below, the techniques described in this disclosure may preserve tenant isolation in which each network service is used by a single tenant and may enable traffic steering among different VNFs.

In accordance with the techniques described herein, controller 5 may configure, within each namespace, a virtual network for a pod and an application service address for an application service to enable access to the pod. In some examples, the techniques described herein may further provide a controller 5 for configuring a service chain between a pod virtual network of one namespace and an application service virtual network of a different namespace to provide access to application services while maintaining tenant isolation. Although FIG. 1 is illustrated with each server having a single namespace (e.g., namespaces A and B, respectively), the techniques are equally applicable to examples in which a server may have multiple namespaces for each tenant.

In the example of FIG. 1, controller 5 may generate configuration data to configure a pod virtual network into a network namespace (e.g., namespace A) for containers of any of pods 22A-22X such that the virtual router 21A is configured to send packets received from the virtual network via the virtual network interfaces 26A-26N to containers of pods 22A-22X and to send packets received via the virtual network interfaces 26A-26N from containers of pods 22A-22X on the virtual network. For example, controller 5 may allocate a virtual network address (IP address) for the pod virtual network of pod 22A for namespace A. In some example implementations, the virtual IP address is allocated and/or generated pursuant to Classless-Inter Domain Routing (CIDR) procedures, thereby using a CIDR that defines the network addresses and routing for pods of a particular namespace (referred to herein as "pod CIDR"). In the example of FIG. 1, controller 5 may send the configuration data to server 12A (e.g., to a virtual networking agent) to configure server 12A with the configuration data generated by controller 5 described above. For example, network module 17A may, based on the configuration data, attach virtual network interface 26A to pod 22A of namespace A to enable packetized communications to/from pod 22A.

Controller 5 may also configure, for namespace A, application service 28A (e.g., load balancing) that may provide access to one or more pods associated with the application service. As one example, each of application services 28A-28X is a Kubernetes service that is an abstraction that defines a logical set of pods running in a cluster. For example, controller 5 may determine a virtual network address (IP address) configured (e.g., by an administrator)

for application service 28A (referred to herein as "service CIDR" or "application service address") for namespace A. Controller 5 may associate application service 28A (commonly referred to as "front end service") with one or more pods (e.g., pods 22A-22X) (commonly referred to as "backend pods") for namespace A. As one example, controller 5 may map the application service address of application service 28A with one or more virtual network identifiers (e.g., 26A-26N) of the one or more pods. Controller 5 may send the configuration data to server 12A (e.g., to a virtual networking agent) to configure server 12A according to the configuration data generated by controller 5 described above. In this way, virtual router 21A may be configured to load balance traffic to one or more pods that are associated with application service 28A.

Controller 5 may also generate configuration data to configure a pod virtual network into the network namespace (e.g., namespace B) for containers of any of pods 22A'-22X' such that the virtual router 21X is configured to send packets received from the virtual network via virtual network interfaces 26A'-26N' to containers of pods 22A'-22X' and to send packets received via the virtual network interfaces 26A'-26N' from containers of pods 22A'-22X' on the virtual network. For example, controller 5 may allocate a virtual network address (IP address) for the pod virtual network of pod 22A' for namespace B. In the example of FIG. 1, controller 5 may send the configuration data to server 12X (e.g., to a virtual networking agent) to configure server 12X with the configuration data generated by controller 5 described above. For example, network module 17X may, based on the configuration data, attach virtual network interface 26A' to pod 22A' of namespace B to enable packetized communications to/from pod 22A'.

Controller 5 may also configure, for namespace B, application service 28X that may provide access to one or more pods associated with the application service. As one example, controller 5 may determine a virtual IP address (application service address) for application service 28X for namespace B. Controller 5 may associate application service 28X with one or more backend pods (e.g., pods 22A'-22X') for namespace B. As one example, controller 5 may map the application service address of application service 28X with one or more virtual network identifiers (e.g., VNIs 26A'-26N') of the one or more pods. Controller 5 may send the configuration data to server 12X (e.g., to a virtual networking agent) to configure server 12X according to the configuration data generated by controller 5 described above. In this way, virtual router 21X may be configured to load balance traffic to one or more pods that are associated with application service 28X. In this way, rather than having a common application service virtual network shared among all the namespaces, the techniques described herein provide for the configuration of an application service virtual network for each of the namespaces.

In response to configuring the two separate routing instances for a pod virtual network and application service virtual network within each namespace, controller 5 may also provision other components of computing infrastructure 8 with forwarding information to direct the components to forward traffic along service chain 29.

Service nodes 15 may implement service chains, e.g., service chain 29, using internally configured forwarding state that directs packets of a packet flow along service chain 29 for processing by the one or more service nodes 15. Such forwarding state may specify tunnel interfaces for tunneling to/from service nodes 15 using network tunnels such as Internet Protocol (IP), Multiprotocol Label Switching (MPLS) label switched paths (LSPs), Generic Route Encapsulation (GRE) tunnels, or by using Virtual Local Area Networks (VLANs), VXLAN techniques, and so forth. An MPLS or VxLAN label may identify, a routing instance for tunneled packets with which to forward the tunneled packets from pod 22A to service node 15, and thereafter to application service 28X. Additional information regarding virtual routing and forwarding may be found in found in U.S. Pat. No. 9,479,457, filed Jun. 19, 2014 and entitled High-Performance, Scalable and Drop-Free Data Center Switch Fabric, the entire contents of which being incorporated by reference in its entirety.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

For service chain 29, for example, controller 5 may provision respective routing instances (e.g., VRFs) that include virtual interfaces for service nodes 15 to steer traffic along service chain 29 from pod 22A to service node 15A, and then to virtual router 21X. More specifically, and as further described below with respect to FIG. 2, controller 5 may communicate with service nodes 15 to (1) manipulate route targets and provision service node 15 servers and/or advertise routes within the virtual and/or physical networks, and/or (2) manipulate next-hops and/or labels of the routes from routing instance to routing instance to steer traffic through the right routing instances and, accordingly, the right virtual interfaces for service nodes 15 in order to realize service chain 29.

As one example, controller 5 may configure a route obtained from a destination network (e.g., virtual network for application service 28X of namespace B) for the network traffic to direct traffic along service chain 29 rather than directly to pod 22X configured for namespace B. Since pods are ephemeral constructs, pod-to-service communication (i.e., service chain 29) is preferred over pod-to-pod communication. Although service chain 29 is illustrated in FIG. 1 as a service chain between different servers (e.g., servers 12A and 12X), service chain 29 may be a service chain between namespaces of the same server (i.e., a pod of a first namespace and an application service of a second namespace within server 12A, for example).

Controller 5 may then configure the routes into a routing instance to cause service node 15 that participates in (or "has") the routing instance to import the routes. As one example, and as further described in FIG. 2, controller 5 may manipulate the next-hops of a route from a virtual routing and forwarding instance (VRF) associated with pod 22A to service node 15A, and from service node 15A to a VRF associated with application service 28X. In this way, the techniques may provide pod-to-service service chaining such that tenant isolation may be preserved.

Figure 2:
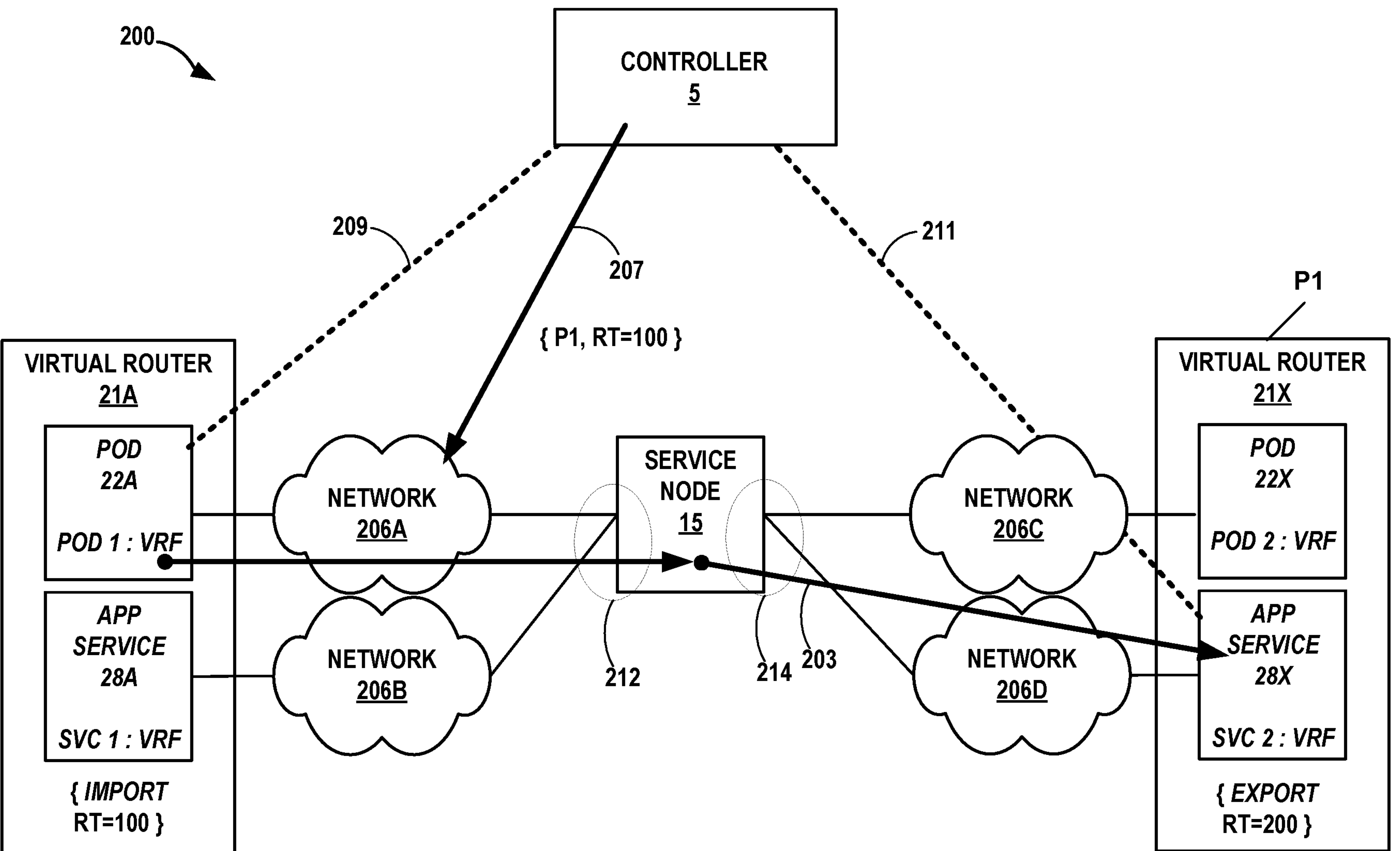
FIG. 2 is a block diagram illustrating an example network system in accordance with the techniques described in this disclosure.

FIG. 2 is a block diagram of an example network system in accordance with the techniques described in this disclosure. Network system 200 includes networks 206A-206D (collectively, "networks 206") having respective virtual routers 21A-21X (collectively, "virtual routers 21"), controller 5, and service node 15. Network system 200 may represent at least a portion of an example aspect of computing infrastructure 8 of FIG. 1.

In some cases, network system 200 implements BGP/Multiprotocol Label Switching (BGP/MPLS) Internet Protocol (IP) Virtual Private Networks (VPNs) to segregate traffic for different customers by ensuring that routes from different VPNs remain distinct and separate, regardless of whether VPNs for respective customers have overlapping address spaces. For each VPN configured for the network system 200 and in which a particular virtual router 21 participates, the virtual router maintains a Virtual Routing and Forwarding instance (VRF). In general, each virtual network for a pod or service is associated with a VRF. For example, pod 22A is associated with POD 1: VRF, application service 28A is associated with SVC 1: VRF, pod 22X is associated with POD 2: VRF, and application service 28X is associated with SVC 2: VRF. For any given VPN, the virtual router 21 learns routes for the VPN, in some cases from the pods or service, and installs the VPN routes to the corresponding VRF, which the virtual router 21 uses to forward traffic. In addition, the virtual router 21 distributes learned VPN routes to other virtual routers 21 (or to virtual routers of other networks) using BGP. BGP/MPLS IP VPNs are described in detail in Rosen & Rekhter, "BGP/MPLS IP Virtual Private Networks (VPNs)," Internet Engineering Task Force Network Working Group, Request for Comments 4364, February 2006, which is incorporated herein by reference in its entirety (hereinafter, "RFC 4364").

In instances that use BGP/MPLS IP VPNs, virtual routers 21 use Route Target (RT) extended communities ("route targets") to control the distribution of routes into VRFs. For a given collection of virtual routers that peer using BGP, each virtual router might only store VPN routes that are received and marked with route targets corresponding to VRFs for the pod or service. The virtual router may discard all other VPN routes that it receives.

Virtual routers 21 are logically located at the "edge" of respective networks 206 and connect to one or more virtual network endpoints (e.g., pods/application services). Networks 206 may represent virtual networks (e.g., VPNs) established for network system 200. For example, network 206A may represent a pod virtual network for namespace A and network 206B may represent an application service virtual network for namespace A. Similarly, network 206C may represent a pod virtual network for namespace B and network 206D may represent an application service virtual network for namespace B.

CE devices (not shown in FIG. 2) may each represent a network device, located at a customer site, that connects to either of networks 206 to receive services. Although referred to herein as devices, CE and customer devices (also not shown in FIG. 2) may represent either physical or virtual machines (VMs), routers, switches, appliances, and controllers, for example. Furthermore, customer devices such as application VMs may be considered CE devices from the perspective of the VPN despite not implementing conventional edge functionality, such as speaking one or more routing protocols.

Components of network system 200 implement Virtual Private Networks (VPNs) to segregate traffic by ensuring that routes from different VPNs remain distinct and separate, regardless of whether the multiple VPNs have overlapping address spaces. In some cases, the VPNs represent Internet Protocol VPNs (IP VPNs) such as BGP/Multiprotocol Label Switching (BGP/MPLS) IP VPNs. For each VPN configured for the network system 200 and in which a particular virtual router of virtual routers 21 participates, the virtual router may implement a VPN Routing and Forwarding instance (VRF). A virtual router that implements a VRF of the network system 200 may have a distinct routing table for the VRF by which the virtual router forwards network packets associated with the VRF. Because this distinct routing table for the VRF and the VRF itself are often referred to interchangeably, in this respect, the virtual router may also be referred to as "having" a VRF. In the example of FIG. 2, virtual router 21A may have a routing table for pod 22A (e.g., POD 1: VRF) and a routing table for application service 28A (e.g., SVC 1: VRF). Similarly, virtual router 21X may have a routing table for pod 22X (e.g., POD 2: VRF) and a routing table for application service 28X (e.g., SVC 2: VRF).

For any given VPN, a virtual router 21 learns routes for the VPN from virtual network endpoints connected to the virtual router 21. One or more VRFs of the virtual routers 21 may be configured with a route target to direct the virtual router to import all routes received that are marked with the route target into the VRFs. In addition, the virtual routers 21 may distribute learned VPN routes to other virtual routers 21 using a routing protocol such as BGP. BGP/MPLS IP VPNs are described in detail in RFC 4364, incorporated above. In the illustrated example, virtual router 21A is configured to import routes marked with a route target of 100, and virtual router 21X is configured to export routes marked with a route target of 200. Each of networks 206 may be associated with a different VRF. The VRF for network 206A and VRF for network 206B are associated with the route target of 100 and the VRF for network 206C and VRF for network 206D are associated with the route target of 200.

Within a single VPN, pairs of virtual routers 21 may connect by a bidirectional tunnel (not shown for ease of illustration), which may include at least one MPLS label switched path (LSP), Generic Route Encapsulation tunnel, VxLAN, or other suitable tunneling connection between pairs of virtual routers 21 that is capable of tunneling IP traffic between the virtual routers.

Service node 15 represents a physical or virtual node that applies a service to network traffic received by the service node 15. Service node 15 may, for instance, apply network services such as firewall, DPI, IDS, IPS, carrier grade network address translation (CG-NAT), performance enhancement proxies for video, transport control protocol (TCP) optimization and header enrichment, caching, and load balancing to the network traffic.

Service node 15 may represent an appliance (e.g., firewall appliance, VPN appliance, and so forth), server, components or modules of a single appliance or server, virtual machines executed a server, or any combination of the above. Service node 15 may be a device managed as part of a value-added services complex, which may represent a data center. Service node 15 may also, in some instances, be coupled by one or more switches or virtual switches of a core network, may in some instances be inline for packet flows from a gateway of any of networks 206, or any combination of the above. Service node 15 may represent a virtual machine orchestrated by the controller 5 that implements, in accordance with techniques described herein, service chains by sequentially directing packets from the service node 15 to application services (e.g., application service 28X) according to orderings specified by one or more service chains. Service node 15 may be associated with an IP address by which the service node is addressable to direct network traffic. Service node 15 may in some examples alternatively be referred to as a "service point," "value-added service (VAS) point" or node, or "network function virtualization (NFV) node."

Network function virtualization involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines instead of on physical hardware appliances. Network function virtualization in the service provider network may provide Value Added Services (VAS) for edge networks such as business edge networks, broadband subscriber management edge networks, and mobile edge networks.

The arrows denoted as service path 203 illustrate a path taken by packet flows mapped to a corresponding service chain for service path 203. The controller 5 may compute and establish service path 203. The controller 5 manages (at least in part) VPNs of network system 200 to direct traffic along service path 203 to service node 15 and thereafter to virtual router 21X, which forwards the traffic to the virtual network endpoint, application service 28X. The traffic may be destined for address prefixes originated by virtual router 21X as well as sourced by address prefixes originated by virtual router 21A. The controller 5 may represent one or more servers, appliances, dedicated controller devices, or any combination of the above that executes processes to manage VPNs of network system 200. In the illustrated example, the controller 5 establishes communication session 209 with at least one device of network 206A to exchange control state information. For example, virtual router 21A may provide routes reachable by network 206A including a route to pod 22A. The route may include a virtual network identifier for network 206A, and a physical network address for a network element that executes virtual router 21A (e.g., server 12A of FIG. 1). Communication session 209 may represent an Extensible Messaging and Presence Protocol (XMPP) sessions, or a session for another communication protocol suitable for exchanging control state, with virtual router 21A of network 206A. Although described as a "session," communication session might not necessarily be stateful.

The controller 5 further exchanges communication via communication session 211 with at least one device of network 206D. Communication session 211 may represent an XMPP session or a session for another communication protocol suitable for exchanging control state. Via communication session 211, virtual router 21X may exchange control state with controller 5. For example, virtual router 21X may provide routes reachable by network 206D including a route for prefix P1. The route may include one or more of the prefix P1, a virtual network identifier for network 206D, and a physical network address for a network element that executes PE router 108B (e.g., a real server).

In accordance with techniques described herein, the controller 5 receives, via communication session 211, at least one route for network 206D for an address prefix P1 for which virtual router 21X is the next hop router. To establish service path 203 to direct traffic originated in network 206A and destined to prefix P1 to service node 15 for processing, controller 5 modifies the next hop for P1 received from communication session 211 to refer to an interface of service node 15. In some examples, modifying the next hop for P1 may include modifying a destination network address for an underlying physical network to point to a network address of a server that executes virtual router 21X. In some examples, modifying the next hop for P1 may also, or alternatively, include modifying a label or other virtual network identifier, tunnel encapsulation information, or other next hop information that identifies virtual router 21X and (in some cases) an underlying physical network (server 12X).

For example, controller 5 may generate, or obtain from virtual router 21X via communication session 111, a route that specifies virtual router 21X as the next hop. The controller 5 may modify the left interface 212 (referred to herein as "left VRF") and right interface 214 (referred to herein as "right VRF") of service node 15.

In particular, controller 5 may modify the left VRF to specify service node 15 as the next hop address. In some instances, the controller 5 may modify the next hop to include a virtual network identifier that identifies a routing instance for virtual router 21A. For example, the left VRF of service node 15 may be modified to correspond to POD 1: VRF. Controller 5 may also modify the next hop to instead specify virtual router 21X as the next hop address for service node 15. In some instances, the controller 5 may modify the next hop to include an application service address for application service 28X implemented by virtual router 21X. For example, the right VRF of service node 15 may be modified to correspond to SVC 2: VRF. As a result, service node 15 may direct service path 203 traffic that includes the application service address to virtual router 21X.

Figure 3:
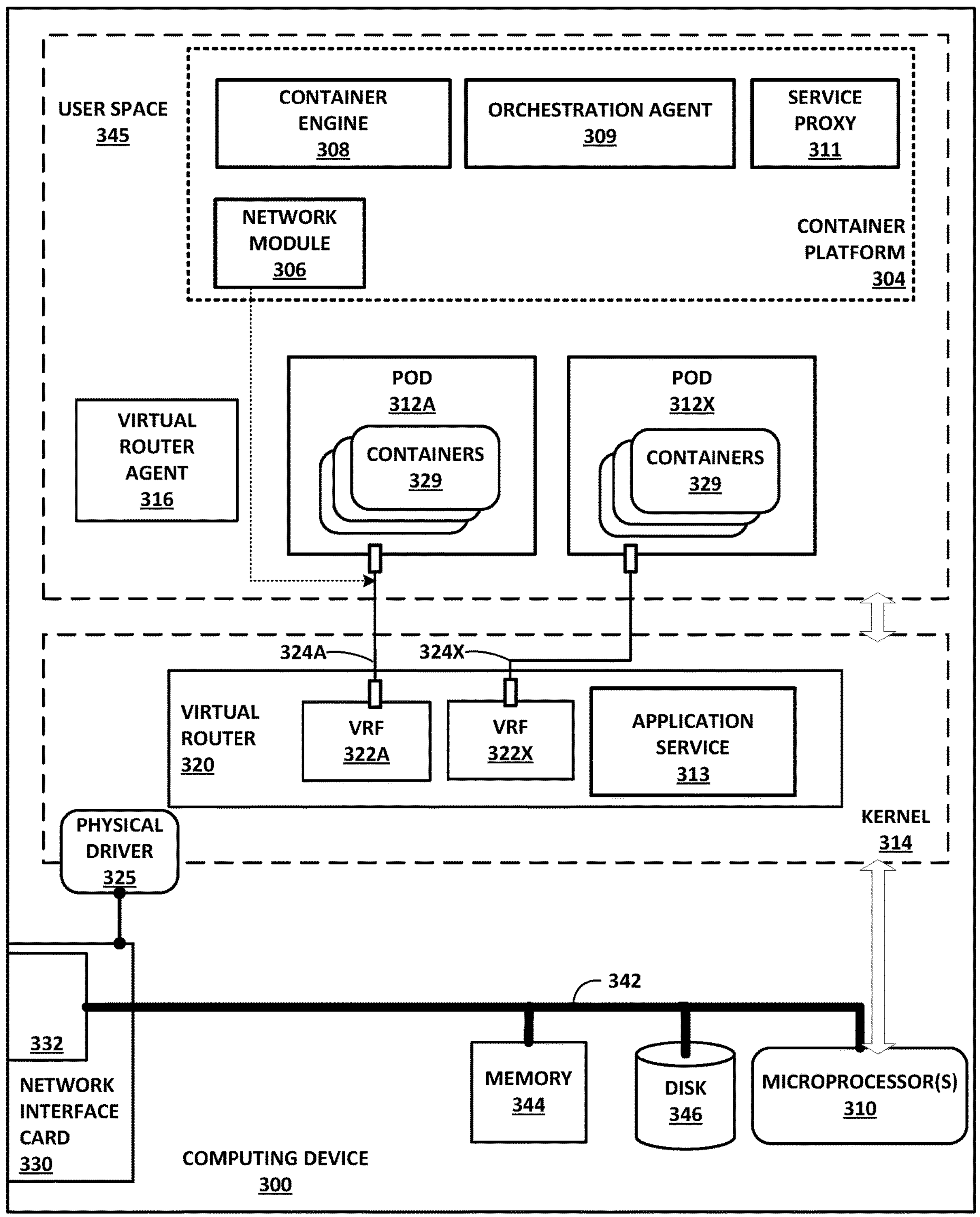
FIG. 3 is a block diagram of an example computing device for configuring respective virtual network interfaces for virtual execution elements, according to techniques described in this disclosure.

FIG. 3 is a block diagram of an example computing device (e.g., host) that includes a network module for configuring two separate virtual networks for a pod virtual network and an application for a given namespace, according to techniques described in this disclosure. Computing device 300 of FIG. 3 may represent a real or virtual server and may represent an example instance of any of servers 12 of FIG. 1. Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). NIC 330 may be SR-IOV-capable. A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (WM). An operating system that includes kernel 314 provides an execution environment for one or more processes in user space 345.

Kernel 314 includes a physical driver 325 to use the network interface card 330. Network interface card 330 may also implement SR-IOV to enable sharing the physical network function (I/O) among one or more virtual execution elements, such as containers 329 or one or more virtual machines (not shown in FIG. 3). Shared virtual devices such as virtual functions may provide dedicated resources such that each of the virtual execution elements may access dedicated resources of NIC 330, which therefore appears to each of the virtual execution elements as a dedicated NIC. Virtual functions may represent lightweight PCIe functions that share physical resources with a physical function used by physical driver 325 and with other virtual functions. For an SR-IOV-capable NIC 330, NIC 330 may have thousands of available virtual functions according to the SR-IOV standard, but for I/O-intensive applications the number of configured virtual functions is typically much smaller.

Computing device 300 may be coupled to a physical network switch fabric that includes an overlay network that extends switch fabric from physical switches to software or "virtual" routers of physical servers coupled to the switch fabric, including virtual router 320. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 300 of FIG. 3, virtual router 320 executes within kernel 314, but virtual router 320 may execute within a hypervisor, a host operating system, a host application, or a virtual machine in various implementations.

Virtual router 320 may replace and subsume the virtual routing/bridging functionality of the Linux bridge/OVS module that is commonly used for Kubernetes deployments of pods 312. Virtual router 320 may perform bridging (e.g., E-VPN) and routing (e.g., L3VPN, IP-VPNs) for virtual networks. Virtual router 320 may perform networking services such as applying security policies, NAT, multicast, mirroring, and load balancing. Additional details for IP-VPNs are described in "BGP/MPLS IP Virtual Private Networks (VPNs)," Request for Comments 4364, Internet Engineering Task Force Network Working Group, February 2006, hereinafter "RFC 4364," which is incorporated by reference herein in its entirety. Virtual router 320 may represent a PE router and virtual execution endpoints may be examples of CE devices described in RFC 4364.

In general, pods 312 may each be assigned one or more virtual network addresses for use within respective virtual networks, where each of the virtual networks may be associated with a different virtual subnet provided by virtual router 320. Pods 312 may each be assigned its own virtual layer three (L3) IP address, for example, for sending and receiving communications but may be unaware of an IP address of the computing device 300. The virtual network address may thus differ from the logical address for the underlying, physical computer system, e.g., computing device 300.

Computing device 300 includes a virtual router agent 316 that controls the overlay of virtual networks for computing device 300 and that coordinates the routing of data packets within computing device 300. In general, virtual router agent 316 communicates with a network controller (e.g., network controller 24 of FIG. 1) for the virtualization infrastructure, which generates commands to control generation of virtual networks and configure network virtualization endpoints, such as computing device 300 and, more specifically, virtual router 320, as a well as virtual network interfaces 324, 325. By configuring virtual router 320 based on information received from network controller 24, virtual router agent 316 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 329 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 320. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 320 performs tunnel encapsulation/de-encapsulation for packets sourced by/destined to any containers of pod 312, and virtual router 320 exchanges packets with pod 312 via bus 342 and/or a bridge of NIC 330.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 320 implements one or more virtual routing and forwarding instances (VRFs) 322A-322X (collectively, "VRFs 322") for respective virtual networks for which virtual router 320 operates as respective tunnel endpoints. In general, each VRF 322 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network.

NIC 330 may receive tunnel packets. Virtual router 320 processes the tunnel packet to determine, from the tunnel encapsulation header, the virtual network of the source and destination endpoints for the inner packet. Virtual router 320 may strip the layer 2 header and the tunnel encapsulation header to internally forward only the inner packet. The tunnel encapsulation header may include a virtual network identifier, such as a VxLAN tag or MIMS label, that indicates a virtual network, e.g., a virtual network corresponding to VRF 322A. VRF 322A may include forwarding information for the inner packet. For instance, VRF 322A may map a destination layer 3 address for the inner packet to virtual network interface 324A. VRF 322A forwards the inner packet via virtual network interface 324A to pod 312A in response. Similarly, VRF 322X may map a destination layer 3 address for the inner packet to virtual network interface 324X. VRF 322X forwards the inner packet via virtual network interface 324X to pod 312X in response.

Containers 329 may also source inner packets as source virtual network endpoints. Containers 329, for instance, may generate a layer 3 inner packet destined for a destination virtual network endpoint that is executed by another computing device (i.e., not computing device 300) or for another one of containers 329. Containers 329 sends the layer 3 inner packet to virtual router 320 via virtual network interface 324A attached to VRF 322A. Similarly, containers 329 sends the layer 3 inner packet to virtual router 320 via virtual network interface 324X attached to VRF 322X.

Virtual router 320 receives the inner packet and layer 2 header and determines a virtual network for the inner packet. Virtual router 320 may determine the virtual network using any of the above-described virtual network interface implementation techniques (e.g., macvlan, veth, etc.). Virtual router 320 uses the VRFs 322 corresponding to the virtual network for the inner packet to generate an outer header for the inner packet, the outer header including an outer IP header for the overlay tunnel and a tunnel encapsulation header identifying the virtual network. Virtual router 320 encapsulates the inner packet with the outer header. Virtual router 320 may encapsulate the tunnel packet with a new layer 2 header having a destination layer 2 address associated with a device external to the computing device 300, e.g., a TOR switch 16 or one of servers 12 of FIG. 1. If external to computing device 300, virtual router 320 outputs the tunnel packet with the new layer 2 header to NIC 330 using physical function. NIC 330 outputs the packet on an outbound interface. If the destination is another virtual network endpoint executing on computing device 300, virtual router 320 routes the packet to the appropriate one of virtual network interfaces 324, 325.

In some examples, a controller for computing device 300 (e.g., network controller 24 of FIG. 1) configures a default route in pod 312A to cause the virtual machines to use virtual router 320 as an initial next hop for outbound packets. In some examples, NIC 330 is configured with one or more forwarding rules to cause all packets received from virtual machines to be switched to virtual router 320.

Pods 312A-312X (collectively, "pods 312") may each represent example instances of respective pods 22 of FIG. 1, in further detail. Each of pods 312 includes one or more containers 329, and application service 313 includes an abstraction that defines a logical set of pods and the policy used to access the pods.

Container platform 304 may represent an example instance of container platforms 19A-19X of FIG. 1, in further detail. Container platform 304 include container engine 308, orchestration agent 309, service proxy 311, and network module 306. Network module 306 may represent an example instance of network modules 17A-17X of FIG. 1, respectively, there being invoked one network module 306 per pod 312.

Container engine 308 includes code executable by microprocessor 310. Container engine 308 may be one or more computer processes. Container engine 308 runs containerized applications in the form of containers 329. Container engine 308 may represent a Docker, rkt, or other container engine for managing containers. In general, container engine 308 receives requests and manages objects such as images, containers, networks, and volumes. An image is a template with instructions for creating a container. A container is an executable instance of an image. Based on directives from controller agent 309, container engine 308 may obtain images and instantiate them as executable containers 329 in one or more pods 312.

Service proxy 311 includes code executable by microprocessor 310. Service proxy 311 may be one or more computer processes. Service proxy 311 monitors for the addition and removal of service and endpoints objects, and it maintains the network configuration of the computing device 300 to ensure communication among pods and containers, e.g., using services. Service proxy 311 may also manage iptables to capture traffic to a service's virtual IP address and port and redirect the traffic to the proxy port that proxies a backed pod. Service proxy 311 may represent a kube-proxy for a minion node of a Kubernetes cluster. In some examples, container platform 304 does not include a service proxy 311 or the service proxy 311 is disabled in favor of configuration of virtual router 320 and pod 312 by network modules 306.

Orchestration agent 309 includes code executable by microprocessor 310. Orchestration agent 309 may be one or more computer processes. Orchestration agent 309 may represent a kubelet for a minion node of a Kubernetes cluster. Orchestration agent 309 is an agent of an orchestrator, e.g., orchestrator 23 of FIG. 1, that receives container specification data for containers and ensures the containers execute by computing device 300. Container specification data may be in the form of a manifest file sent to orchestration agent 309 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pod 312 of containers 329. Based on the container specification data, orchestration agent 309 directs container engine 308 to obtain and instantiate the container images for containers 329, for execution of containers 329 by computing device 300.

In accordance with techniques described herein, orchestration agent 309 instantiates a network module 306 to configure a virtual network interface for pod 312. Network module 306 may represent an example instance of network modules 17A-17X of FIG. 1. For example, orchestration agent 309 receives configuration data that includes container specification data for pod 312 and directs container engine 308 to create the pod 312 with containers 329 based on the container specification data for pod 312.

Orchestration agent 309 also invokes one or more network modules 306 to configure, for pod 312, virtual network interfaces 324 for a virtual network corresponding to VRF 322A. In this example, pod 312 is a virtual network endpoint for the virtual network corresponding to VRF 322A.

Network module 306 may obtain interface configuration data for configuring virtual network interfaces for pods 312. Virtual router agent 316 operates as a virtual network control plane module for enabling network controller 24 to configure virtual router 320. Unlike the orchestration control plane (including the container platforms 304 for minion nodes and the master node(s), e.g., orchestrator 23), which manages the provisioning, scheduling, and managing virtual execution elements, a virtual network control plane (including network controller 24 and virtual router agent 316 for minion nodes) manages the configuration of virtual networks implemented in the data plane in part by virtual routers 320 of the minion nodes. Virtual router agent 316 communicates, to network modules 306, interface configuration data for virtual network interfaces to enable an orchestration control plane element (i.e., network module 306) to configure the virtual network interfaces according to the configuration state determined by the network controller 24, thus bridging the gap between the orchestration control plane and virtual network control plane.

Virtual router agent 316 may also receive configuration data that includes application service specification data for application service 313 and attaches one or more of virtual network interfaces 324 to application service 313. The application service specification data may include a mapping of one or more of pods 312 with an application service address of application service 313. In this way, virtual router agent 316 may configure the application service address for application service 313 such that virtual router 320 may load balance traffic to one or more pods 312 that are associated with application service 313.

Figure 4:
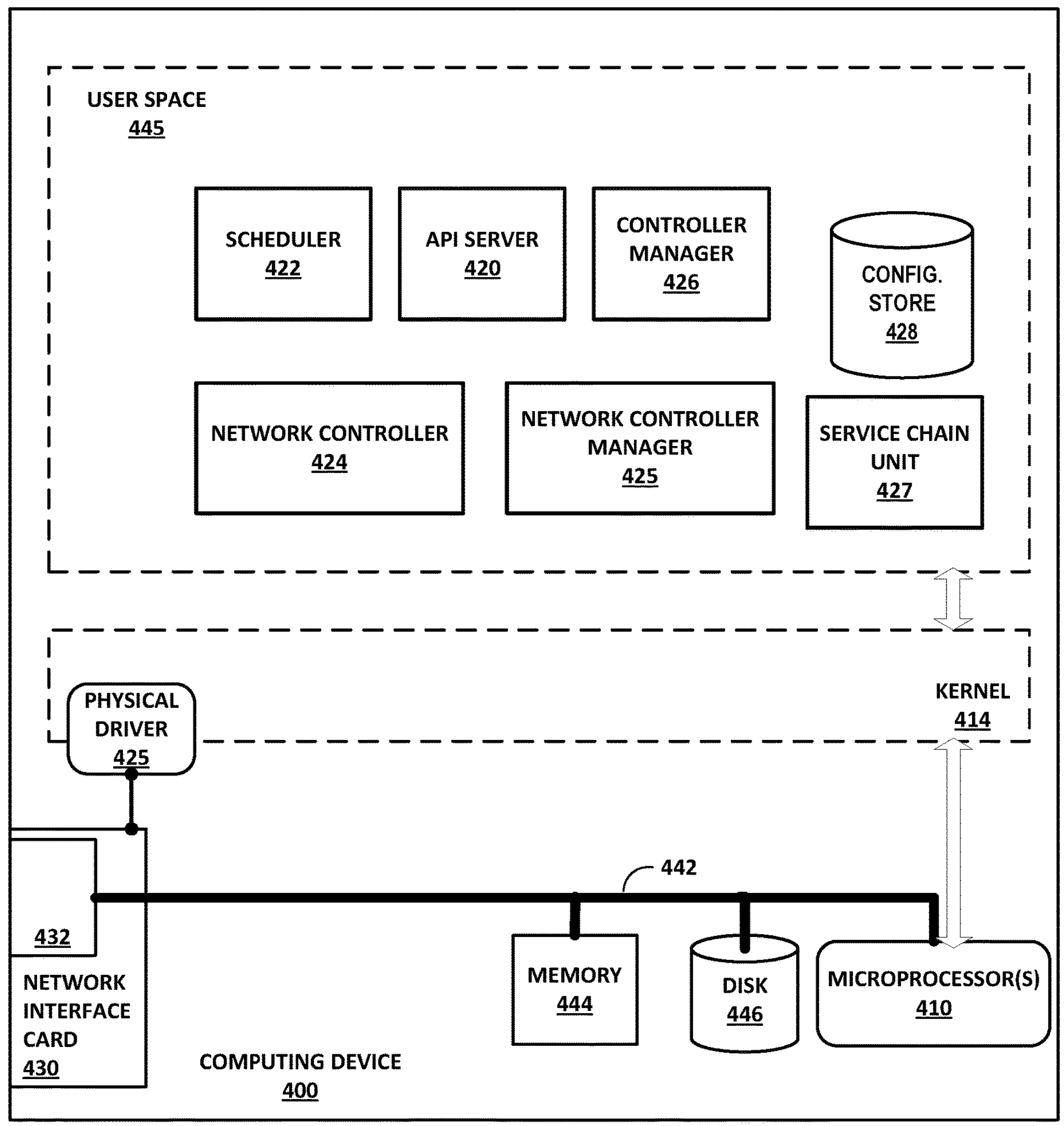
FIG. 4 is a block diagram of an example computing device operating as an instance of controller for a virtualized computing infrastructure, according to techniques described in this disclosure.

FIG. 4 is a block diagram of an example computing device operating as an instance of controller for a virtualized computing infrastructure. Computing device 400 may be an example instance of controller 5 for a virtualized computing infrastructure. Computing device 400 of FIG. 4 may represent one or more real or virtual servers configured to perform operations for at least one of a network controller 24 and an orchestrator 23. As such, computing device 400 may in some instances implement one or more master nodes for respective clusters.

Scheduler 422, API server 420, controller manager 426, network controller 424, network controller manager 425, and configuration store 428, although illustrated and described as being executed by a single computing device 400, may be distributed among multiple computing devices 400 that make up a computing system or hardware/server cluster. Each of the multiple computing devices 400, in other words, may provide a hardware operating environment for one or more instances of any one or more of scheduler 422, API server 420, controller manager 426, network controller 424, network controller manager 425, or configuration store 428. Network controller 424 may represent an example instance of network controller 24 of FIG. 1. Scheduler 422, API server 420, controller manager 426, and network controller manager 425 may implement an example instance of orchestrator 23. Network controller manager 425 may represent an example implementation of a Kubernetes cloud controller manager. Network controller 424 may represent an example instance of network controller 24 of FIG. 1.

Computing device 400 includes in this example, a bus 442 coupling hardware components of a computing device 400 hardware environment. Bus 442 couples network interface card (NIC) 330, storage disk 446, and one or more microprocessors 410 (hereinafter, "microprocessor 410"). A front-side bus may in some cases couple microprocessor 410 and memory device 444. In some examples, bus 442 may couple memory device 444, microprocessor 410, and NIC 4330. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 4342.

Microprocessor 410 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 410.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 444 provides a physical address space composed of addressable memory locations.

Network interface card (NIC) 430 includes one or more interfaces 432 configured to exchange packets using links of an underlying physical network. Interfaces 432 may include a port interface card having one or more network ports. NIC 430 may also include an on-card memory to, e.g., store packet data. Direct memory access transfers between the NIC 430 and other devices coupled to bus 442 may read/write from/to the NIC memory.

Memory 444, NIC 4330, storage disk 446, and microprocessor 410 may provide an operating environment for a software stack that includes an operating system kernel 414 executing in kernel space. Kernel 414 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 414 provides an execution environment for one or more processes in user space 445. Kernel 414 includes a physical driver 425 to use the network interface card 430.

Computing device 400 may be coupled to a physical network switch fabric that includes an overlay network that extends switch fabric from physical switches to software or "virtual" routers of physical servers coupled to the switch fabric, such as virtual router 320 of FIG. 3. Computing device 400 may use one or more dedicated virtual networks to configure minion nodes of a cluster.

API server 420, scheduler 422, controller manager 426, and configuration store may implement a master node for a cluster and be alternatively referred to as "master components." The cluster may a Kubernetes cluster and the master node a Kubernetes master node, in which case the master components are Kubernetes master components.

API server 420 includes code executable by microprocessor 410. API server 420 may be one or more computer processes. API server 420 validates and configures data for objects, such as virtual execution elements (e.g., pods of containers), application services, and replication controllers, for instance. An application service may be an abstraction that defines a logical set of pods and the policy used to access the pods. The set of pods implementing a service are selected based on the service definition. A service may be implemented in part as, or otherwise include, a load balancer. API server 420 may implement a Representational State Transfer (REST) interface to process REST operations and provide the frontend to a corresponding cluster's shared state stored to configuration store 328. API server 420 may authenticate and authorize requests. API server 420 communicates with other components to instantiate virtual execution elements in the computing infrastructure 8. API server 420 may represent a Kubernetes API server.

Configuration store 428 is a backing store for all cluster data. Cluster data may include cluster state and configuration data. Configuration data may also provide a backend for service discovery and/or provide a locking service. Configuration store 428 may be implemented as a key value store. Configuration store 428 may be a central database or distributed database. Configuration store 428 may represent an etcd store. Configuration store 428 may represent a Kubernetes configuration store.

Scheduler 422 includes code executable by microprocessor 410. Scheduler 422 may be one or more computer processes. Scheduler 422 monitors for newly created or requested virtual execution elements (e.g., pods of containers and/or application service) and selects a minion node on which the virtual execution elements are to run. Scheduler 422 may select a minion node based on resource requirements, hardware constraints, software constraints, policy constraints, locality, etc. Scheduler 422 may represent a Kubernetes scheduler.

In general, API server 420 may invoke the scheduler 422 to schedule a virtual execution element, which may select a minion node and returns an identifier for the selected minion node to API server 420, which may write the identifier to the configuration store 428 in association with the virtual execution element. API server 420 may invoke the orchestration agent 309 of FIG. 3 for the selected minion node, which may cause the container engine 308 for the selected minion node to obtain the virtual execution element from a storage server and create the virtual execution element on the minion node. The orchestration agent 309 for the selected minion node may update the status for the virtual execution element to the API server 420, which persists this new state to the configuration store 428. In this way, computing device 400 instantiates new virtual execution elements in the computing infrastructure 8.

Controller manager 426 includes code executable by microprocessor 410. Controller manager 426 may be one or more computer processes. Controller manager 426 may embed the core control loops, monitoring a shared state of a cluster by obtaining notifications from API Server 420. Controller manager 426 may attempt to move the state of the cluster toward the desired state. Example controllers (not shown) managed by the controller manager 426 may include a replication controller, endpoints controller, namespace controller, and service accounts controller. Controller manager 426 may perform lifecycle functions such as namespace creation and lifecycle, event garbage collection, terminated pod garbage collection, cascading-deletion garbage collection, node garbage collection, etc. Controller manager 426 may represent a Kubernetes Controller Manager for a Kubernetes cluster.

Network controller 424 includes code executable by microprocessor 410. Network controller 424 may include one or more computer processes. Network controller 424 may represent an example instance of network controller 24 of FIG. 1. The network controller 424 may be a logically centralized but physically distributed Software Defined Networking (SDN) controller that is responsible for providing the management, control, and analytics functions of a virtualized network. In particular, network controller 424 may be a logically centralized control plane and management plane of the computing infrastructure 8 and orchestrates vRouters for one or more minion nodes.

Network controller 424 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 424 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 424 programs network infrastructure elements to create virtual networks and may create interface configurations for virtual network interfaces for the virtual networks.

Additional information regarding network controller 424 operating in conjunction with other devices of data center 10 or other software-defined network is found in International Application Number PCT/US2013/044378 and in U.S. patent application Ser. No. 14/226,509, incorporated by reference above.

Network controller manager 425 includes code executable by microprocessor 410. Network controller manager 425 may be one or more computer processes. Network controller manager 425 operates as an interface between the orchestration-oriented elements (e.g., scheduler 422, API server 420, controller manager 426, and configuration store 428) and network controller 424. In general, network controller manager 425 monitors the cluster for new objects (e.g., pods and services). Network controller manager 425 may isolate pods in virtual networks and connect pods with services.

Network controller manager 425 may be executed as a container of the master node for a cluster. In some cases, using network controller manager 425 enables disabling the service proxies of minion nodes (e.g., the Kubernetes kube-proxy) such that all pod connectivity is implemented using virtual routers, as described herein.

In accordance with techniques described herein, network controller manager 425 may drive the creation of respective virtual network interfaces for a pod (e.g., pod 312 of FIG. 3) and configure the pod for communicating with an application service that defines a logical set of pods that are members of the service (e.g., application service 313 of FIG. 3). For example, network controller manager 425 may operate in conjunction with service chain unit 427 to configure a service chain between a pod virtual network of one namespace and an application service address of a different namespace. For example, service chain unit 427 may establish service chains in part by configuring routes into devices managed and controlled by network controller 424. As one example implementation, service chain unit 427 may configure a service chain by configuring the left interface of a service node with a virtual routing and forwarding instance (VRF) identifying pod 312 of namespace A and the right interface of the service node with a VRF identifying application service 313 of namespace B.

Various components, functional units, and/or modules illustrated in FIGS. 1-4 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 5A:
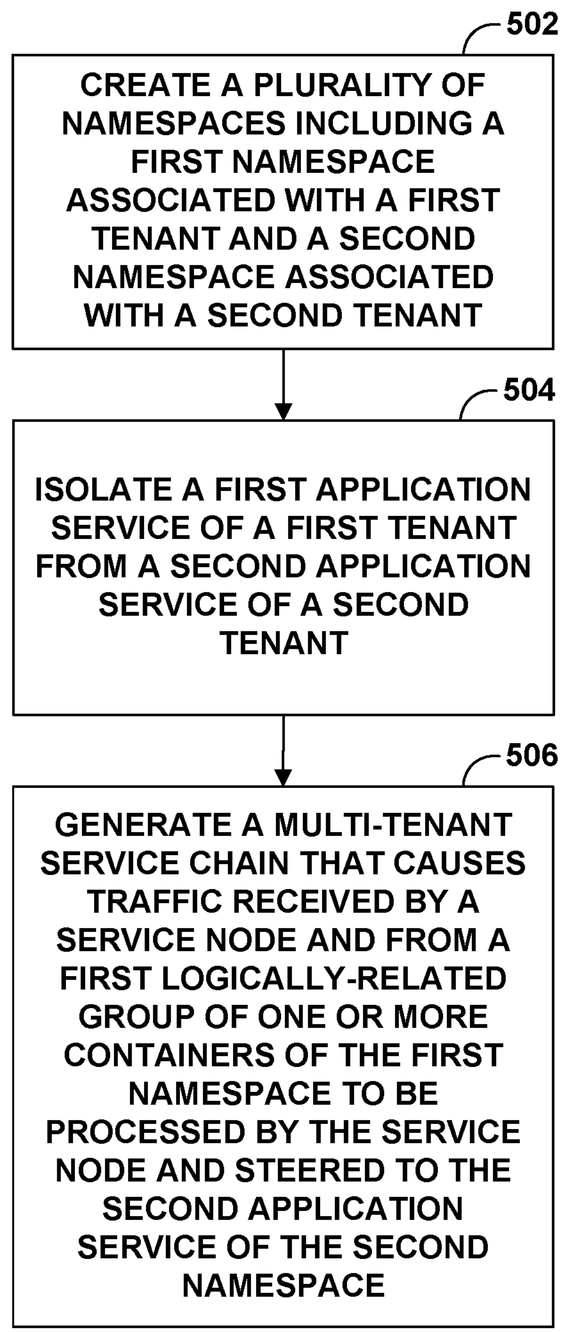
FIG. 5A is a flow diagram illustrating an example creation of isolated service networks on a per-namespace basis and a service chain among the isolated networks, in accordance with the techniques described in this disclosure.

FIG. 5A is a flow diagram illustrating an example creation of isolated service networks on a per-namespace basis and a service chain among the isolated networks, in accordance with the techniques described in this disclosure. For purposes of example, the operations are described with respect to controller 5 and data center 10 of FIG. 1.

In the example of FIG. 5A, controller 5 may create a plurality of namespaces for each tenant of data center 10 (502). For example, controller 5 may create namespace A for a first tenant, and create namespace B for a second tenant.

Controller 5 may isolate a first application service network of the first tenant from a second application service network of the second tenant (504). For example, controller 5 may configure each namespace with two separate networks for a pod and an application service. As further described in FIG. 5B, controller 5 may send configuration data to configure a virtual network interface for a pod virtual network and configure an application service address for an application service virtual network for a given namespace.

Controller 5 may generate a multi-tenant service chain that causes traffic received by a service node (e.g., service node 15A) and from a logically-related group of one or more containers (e.g., pod 22A) of the namespace A to be processed by service node 15A (i.e., apply a firewall service), and steer the traffic to an application service (e.g., application service 28X of namespace B (506). For example, controller 5 may provision respective routing instances (e.g., VRFs) that include virtual interfaces for service nodes 15 to steer traffic along service chain 29 from pod 22A to service node 15A, and then to virtual router 21X. More specifically, controller 5 may communicate with service nodes 15 to (1) manipulate route targets and provision service node 15 servers and/or advertise routes within the virtual and/or physical networks, and/or (2) manipulate next-hops and/or labels of the routes from routing instance to routing instance to steer traffic through the right sequence of routing instances and, accordingly, the right sequence of virtual interfaces for service nodes 15 in order to realize service chain 29. For example, controller 5 may configure service chain 29 by configuring the left interface of service node 15A with a virtual routing and forwarding instance (VRF) identifying pod 22A of namespace A and the right interface of service node 15 with a VRF identifying application service 28X of namespace B.

Figure 5B:
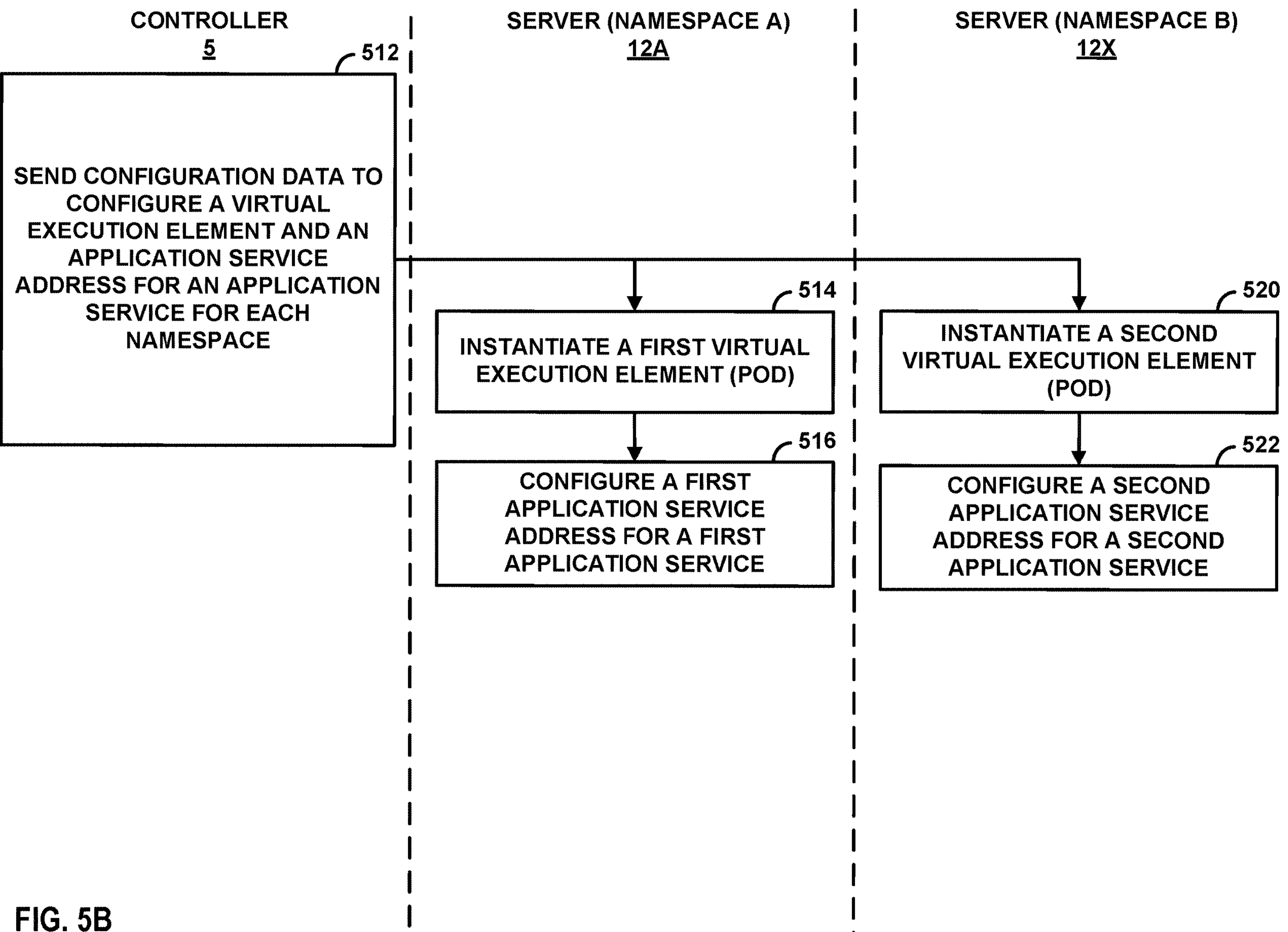
FIG. 5B is a flow diagram illustrating the example configuration of two separate networks for a pod and an application service of a given namespace, according to techniques described in this disclosure.

FIG. 5B is a flow diagram illustrating an example configuration of two separate networks for a pod and an application service of a given namespace, according to techniques described in this disclosure. For purposes of example, the operations are described with respect to controller 5 and data center 10 of FIG. 1.

In the example of FIG. 5B, controller 5 (e.g., orchestrator 23 and network controller 24) may send configuration data to server 12A to configure a virtual execution element (e.g., pod) and an application service address for an application service for an application service for each namespace (512). For example, orchestrator 23 may send, to network controller 24, a first request to create in a first computing device (e.g., server 12A) of the virtualized computing infrastructure a virtual network interface 26A for a virtual network for pod 22A that comprises a logically-related group of one or more containers to be instantiated in server 12A. The request may also include a request to create in server 12A application service 28A. For example, orchestrator 23 may send, to network controller 24, configuration data that comprises a mapping of an application service address (e.g., IP address) for application service 28A and to one or more pods, such as pods 22A-22X. The network controller 24 may then send, to server 12A (e.g., via a virtual router agent), first configuration data to configure virtual network interface 26A for the pod virtual network and to configure the application service address for application service 28A. As one example, network module 17A may attach virtual network interface 26A to enable packetized communication to/from pods 22 via virtual router 21A. Network controller 24 may also send the first configuration data to associate the application service address of application service 28A with the virtual network identifiers of one or more pods 22. Pod 22A-22X and application service 28A may be grouped in the same namespace (e.g., namespace A).

Server 12A may instantiate a first virtual execution element (e.g., pod 22A) (514). For example, an orchestration agent for server 12A may instantiate, for network module 17A, pod 22A comprising a logically-related group of one or more containers. In some examples, the orchestration agent may invoke network module 17A to instantiate the one or more pods. The term "invoke" may refer to the instantiation, as executable code, of a software component or module in memory (e.g., user space 345) for execution by one or more microprocessors 310.

In some examples, server 12A may obtain an identifier of the first virtual network interface for a first virtual network. For example, the orchestration agent for server 12A may obtain an identifier, e.g., pod CIDR, of virtual network interface 26A for a first virtual network. Server 12A may configure, based on the identifier, a virtual network interface for one or more pods to enable packetized communications by the first execution element on the first virtual network. For example, orchestration agent of server 12A may attach virtual network interface 26A to pod 22A to enable packetized communications by pod 22A on the pod virtual network.

Server 12A may also configure a first application service address for a first application service (516). For example, server 12A may receive the configuration data from network controller 24 that includes a mapping of the application service address of application service 28A with one or more virtual network identifiers (e.g., 26A-26N) of the one or more pods. In this way, virtual router 21A may be configured to load balance traffic to one or more pods that are associated with application service 28A.

Similarly, controller 5 (e.g., orchestrator 23 and network controller 24) may send configuration data to server 12X to configure a virtual network interface for a second virtual execution element (pod) and an application service address for an application service (512). For example, orchestrator 23 may send, to network controller 24, a second request to create in a second computing device (e.g., server 12X) of the virtualized computing infrastructure a virtual network interface 26A' for a virtual network for pod 22A' that comprises a logically-related group of one or more containers to be instantiated in server 12X. The request may also include a request to create in server 12X application service 28X. For example, orchestrator 23 may send, to network controller 24, configuration data that comprises a mapping of an application service address (e.g., IP address) for application service 28X and to one or more pods, such as pods 22A'-22X'. The network controller 24 may then send, to server 12X (e.g., via a virtual router agent), second configuration data to configure virtual network interface 26A' for the pod virtual network and to configure the application service address for application service 28X. As one example, network module 17X may attach virtual network interface 26A' to enable packetized communication to/from pods 22A'-22X' via virtual router 21X. Network controller 24 may also send the second configuration data to associate the application service address of application service 28X with the virtual network identifiers of one or more pods 22A'-22X'. Pods 22A'-22X' and application service 28X may be grouped in the same namespace (e.g., namespace B).

Server 12X may instantiate a second virtual execution element (e.g., pod 22A') (520). For example, an orchestration agent for server 12X may instantiate, for network module 17X, pod 22A' comprising a logically-related group of one or more containers. In some examples, the orchestration agent may invoke network module 17X to instantiate the one or more pods. The term "invoke" may refer to the instantiation, as executable code, of a software component or module in memory (e.g., user space 345) for execution by one or more microprocessors 310.

In some examples, server 12X may obtain an identifier of the second virtual network interface for a second virtual network. For example, the orchestration agent for server 12A may obtain an identifier, e.g., pod CIDR, of virtual network interface 26A' for a second virtual network. Server 12X may configure, based on the identifier, a virtual network interface for one or more pods to enable packetized communications by the second execution element on the second virtual network. For example, orchestration agent of server 12X may attach virtual network interface 26A' to pod 22A' to enable packetized communications by pod 22A' on the pod virtual network.

Server 12X may also configure a second application service address for a second application service (522). For example, server 12X may receive the configuration data from network controller 24 that includes a mapping of the application service address of application service 28X with one or more virtual network identifiers (e.g., 26A'-26N') of the one or more pods. In this way, virtual router 21X may be configured to load balance traffic to one or more pods that are associated with application service 28X.

In response to configuring for each namespace the respective networks for a pod virtual network and application virtual network, controller 5 may configure a service chain that causes traffic received by a service node and from the first logically-related group of one or more containers (e.g., pod 22A) to be processed by the service node and steered to the second application service (e.g., application service 28X).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:

creating, by a controller of a multi-tenant virtualized data center, a plurality of namespaces, each of the plurality of namespaces being associated with a different one of a plurality of tenants in the multi-tenant virtualized data center, wherein the plurality of namespaces includes a first namespace associated with a first tenant and a second namespace associated with a second tenant;

isolating, by the controller, a first application service of the first tenant from a second application service of the second tenant by:

configuring, by the controller, a first plurality of networks each associated with the first namespace, wherein configuring the first plurality of networks includes allocating a virtual network address for one or more first virtual execution elements, and mapping an application service address of the first application service with the one or more first virtual execution elements to provide access to the one or more first virtual execution elements, configuring, by the controller, a second plurality of networks each associated with the second namespace, wherein configuring the second plurality of networks includes allocating a virtual network address for one or more second virtual execution elements, and mapping an application service address of the second application service with the one or more second virtual execution elements to provide access to the one or more second virtual execution elements; and configuring a multi-tenant service chain between the one or more first virtual execution elements of the first namespace and the second application service of the second namespace.

2. The method of claim 1, wherein the first virtual execution elements comprise a first logically-related group of one or more containers, wherein the first application service provides load balancing for the first logically-related group of one or more containers, wherein the second virtual execution elements comprise a second logically-related group of one or more containers, and wherein the second application service provides load balancing for the second logically-related group of one or more containers.

3. The method of claim 2, wherein the first logically-related group of one or more containers and the second logically-related group of one or more containers are Kubernetes containers within a pod, and wherein the first application service and the second application service are Kubernetes services.

4. The method of claim 2, wherein the multi-tenant service chain causes traffic received by a service node and from the first logically-related group of one or more containers to be processed by the service node and steered to the second application service.

5. The method of claim 4, wherein the multi-tenant service chain further steers the traffic through a plurality of service nodes including the service node.

6. The method of claim 4, wherein generating the multi-tenant service chain further comprises:

configuring, by the controller and for the service node, a left virtual routing and forwarding instance (VRF) associated with the first logically-related group of one or more containers; and configuring, by the controller and for the service node, a right VRF associated with the second application service.

7. The method of claim 1, wherein configuring the first plurality of networks comprises:

sending, by the controller and to a first computing device of the multi-tenant virtualized data center, first configuration data to configure a first application service address for the first application service, and wherein configuring the second plurality of networks comprises:

sending, by the controller and to a second computing device of the multi-tenant virtualized data center, second configuration data to configure a second application service address for the second application service.

8. The method of claim 7, wherein the first configuration data comprises a first mapping of the first application service address and one or more virtual network interfaces to access the one or more first virtual execution elements; and wherein the second configuration data comprises a second mapping of the second application service address and one or more virtual network interfaces to access the one or more second virtual execution elements.

9. The method of claim 7, further comprising:

instantiating, by the first computing device, a first virtual execution element as a first logically-related group of one or more containers;

configuring, by the first computing device and for a first virtual router, a first application service address for the first application service to enable load balancing for the first virtual execution element via the first application service address;

instantiating, by the second computing device and for a second virtual router, a second virtual execution element as a second logically-related group of one or more containers; and configuring, by the second computing device and for the second virtual router, a second application service address for the second application service to enable load balancing for the second virtual execution element via the second application service address.

10. A controller comprising:

one or more processors coupled to a memory device, wherein the one or more processors are configured to:

create a plurality of namespaces, each of the plurality of namespaces being associated with a different one of a plurality of tenants in a multi-tenant virtualized data center, wherein the plurality of namespaces includes a first namespace associated with a first tenant and a second namespace associated with a second tenant;

isolate a first application service of the first tenant from a second application service of the second tenant by:

configuring a first plurality of networks each associated with the first namespace, wherein configuring the first plurality of networks includes allocating a virtual network address for one or more first virtual execution elements, and mapping an application service address of the first application service with the one or more first virtual execution elements to provide access to the one or more first virtual execution elements; and configuring a second plurality of networks each associated with the second namespace, wherein configuring the second plurality of networks includes allocating a virtual network address for one or more second virtual execution elements, and mapping an application service address of the second application service with the one or more second virtual execution elements to provide access to the one or more second virtual execution elements; and configure a multi-tenant service chain between the one or more first virtual execution elements of the first namespace and the second application service of the second namespace.

11. The controller of claim 10, wherein the first virtual execution elements comprise a first logically-related group of one or more containers, wherein the first application service provides load balancing for the first logically-related group of one or more containers, wherein the second virtual execution elements comprise a second logically-related group of one or more containers, and wherein the second application service provides load balancing for the second logically-related group of one or more containers.

12. The controller of claim 11, wherein the first logically-related group of one or more containers and the second logically-related group of one or more containers are Kubernetes containers within a pod, and wherein the first application service and the second application service are Kubernetes services.

13. The controller of claim 11, wherein the multi-tenant service chain causes traffic received by a service node and from the first logically-related group of one or more containers to be processed by the service node and steered to the second application service.

14. The controller of claim 13, wherein the multi-tenant service chain further steers the traffic through a plurality of service nodes including the service node.

15. The controller of claim 13, wherein, to generate the multi-tenant service chain, the one or more processors are further configured to:

configure, for the service node, a left virtual routing and forwarding instance (VRF) associated with the first logically-related group of one or more containers; and configure, for the service node, a right VRF associated with the second application service.

16. The controller of claim 10, wherein, to configure the first plurality of networks, the one or more processors are further configured to:

send, to a first computing device of the multi-tenant virtualized data center, first configuration data to configure an application service address for the first application service, and wherein, to configure the second plurality of networks, the one or more processors are further configured to:

send, to a second computing device of the multi-tenant virtualized data center, second configuration data to configure an application service address for the second application service.

17. The controller of claim 16, wherein the first configuration data comprises a first mapping of the first application service address and one or more virtual network interfaces to access the one or more first virtual execution elements; and wherein the second configuration data comprises a second mapping of the second application service address and one or more virtual network interfaces to access the one or more second virtual execution elements.

18. A computing device comprising:

one or more processors coupled to a memory device, wherein the one or more processors are configured to:

receive, from a controller, configuration data comprising a virtual network address allocated for a virtual execution element and a mapping of the virtual execution element with an application service address of an application service, wherein the virtual execution element and the application service is included within a first namespace;

instantiate, based on the configuration data, the virtual execution element as a logically-related group of one or more containers;

configure, based on the configuration data, the application service address for the application service to enable access to the virtual execution element via the application service address;

attach, based on the configuration data, a virtual network interface to the virtual execution element to enable packetized communications by the virtual execution element on a virtual network; and steer the packetized communications along a multi-tenant service chain between the virtual execution element of the first namespace and a second application service included within a second namespace.

19. The computing device of claim 18, wherein the configuration data comprises a mapping of the application service address and a virtual network interface to access the virtual execution element.

20. The computing device of claim 18, wherein the logically-related group of one or more containers is a group of one or more Kubernetes containers within a pod, and wherein the application service is a Kubernetes service.

* * * * *